United States Patent
Tidestav et al.

(10) Patent No.: US 10,306,574 B2
(45) Date of Patent: May 28, 2019

(54) SYNCHRONIZATION ASSISTANCE TO A MOBILE STATION

(71) Applicant: Telefonaktiebolaget LM Ericsson (publ), Stockholm (SE)

(72) Inventors: Claes Tidestav, Bålsta (SE); Andreas Cedergren, Bjärred (SE); Andres Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 64 days.

(21) Appl. No.: 15/521,055

(22) PCT Filed: Nov. 3, 2014

(86) PCT No.: PCT/SE2014/051295
§ 371 (c)(1),
(2) Date: Apr. 21, 2017

(87) PCT Pub. No.: WO2016/072886
PCT Pub. Date: May 12, 2016

(65) Prior Publication Data
US 2017/0318549 A1 Nov. 2, 2017

(51) Int. Cl.
*H04W 56/00* (2009.01)
*H04W 36/00* (2009.01)
*H04W 36/08* (2009.01)

(52) U.S. Cl.
CPC ..... *H04W 56/001* (2013.01); *H04W 36/0072* (2013.01); *H04W 56/00* (2013.01); *H04W 36/08* (2013.01)

(58) Field of Classification Search
CPC .......... H04W 56/001; H04W 36/0072; H04W 56/00; H04W 36/08
See application file for complete search history.

(56) References Cited

U.S. PATENT DOCUMENTS

| | | | | |
|---|---|---|---|---|
| 5,577,047 A | * | 11/1996 | Persson | H04B 7/022 370/333 |
| 2007/0149206 A1 | * | 6/2007 | Wang | H04W 36/0077 455/450 |

(Continued)

FOREIGN PATENT DOCUMENTS

| WO | 2007127800 A2 | 11/2007 |
|---|---|---|
| WO | 2010088690 A2 | 8/2010 |

(Continued)

*Primary Examiner* — Afshawn M Towfighi
(74) *Attorney, Agent, or Firm* — Murphy, Bilak & Homiller, PLLC (57) ABSTRACT

A synchronising assisting device (14) sends an adjustment value (AV) to a mobile station (12) for use when synchronising to a resource employed by the target cell (17), where the adjustment value (AV) is an estimate of the change in timing required to synchronise to a reference signal interval of the resource, and processes the adjustment value (AV) if an indication (IATC) of the actual change in timing required for synchronizing to the reference signal interval is received from the mobile station. The mobile station receives the adjustment value (AV), synchronises to the resource starting at a starting point set by the adjustment value (AV), detects a pilot signal in the reference signal interval, determines an actual change in timing required for synchronising to the reference signal interval, investigates the difference and sends an indication (IATC) of the required actual change in timing to the synchronising assisting device (14).

20 Claims, 5 Drawing Sheets

(56) References Cited

U.S. PATENT DOCUMENTS

2011/0151919 A1*  6/2011  Shin ...................... H04W 24/00
                                                                       455/525
2012/0040674 A1*  2/2012  McGilly ........... H04W 36/0066
                                                                       455/436
2013/0258862 A1    10/2013  Dinan

FOREIGN PATENT DOCUMENTS

WO        2011019975 A1    2/2011
WO        2011044559 A1    4/2011

* cited by examiner

SYNCHRONIZATION ASSISTANCE TO A MOBILE STATION

TECHNICAL FIELD

The invention relates to synchronisation to a target cell in a wireless communication network. More particularly, the invention relates to a method, synchronising assisting device, computer program and computer program product for simplifying synchronisation for a mobile station to a target cell as well as to a method, mobile station, computer program and computer program product for synchronising to a reference signal interval of a resource used by a target cell.

BACKGROUND

Handover is a vital part of any mobile communication system. A handover is the process of transferring an ongoing connection of a mobile station or user equipment (UE) from one base station (the serving) to another base station (the target) in order to accomplish a transparent service over a larger area. The handover should take place without any loss of data and with as small an interruption as possible.

To enable a handover, it is necessary to find a suitable target cell, and to ensure that it is possible to sustain reliable communication with that target cell. Candidates for suitable target cell are usually stored in so-called neighbour lists, which are stored at least at the serving base station. To make sure that it is possible to sustain reliable communication with the target cell, the connection quality in the target cell needs to be estimated before the handover can take place.

The quality in the target cell is estimated by measurements related to the mobile station. Both downlink or uplink measurements can be considered. Relying solely on uplink measurements can be quite dangerous, since the uplink connection quality can be different from the downlink connection quality. Therefore, handovers in cellular systems are typically based on downlink measurements.

In legacy systems, i.e. in known systems, all base stations continuously transmit pilot signals that mobile stations in neighbour cells use to estimate the target cell quality. This is true in Global System for Mobile Communications (GSM) where a pilot signal is transmitted on a Broadcast Control CHannel (BCCH), Wideband Code Division Multiple Access (WCDMA) where a pilot signal is transmitted on a Common Pilot CHannel (CPICH) and in Long Term Evolution (LTE) where a pilot signal is transmitted as a Cell Specific Reference Signal (CRS). This leads to that it is possible to estimate the quality of neighbour cells with relatively good accuracy.

When handovers are based on downlink measurements, the mobile station needs to synchronize to transmission from the new (target) base station so that it can measure and decode the signal from the target base station. As most cellular systems are non-synchronized, this process may take a rather long time, and it also puts requirements on the design of the signals transmitted from the target cell. In legacy systems, the continuous pilots are used for this.

Synchronizing to the target cell can take a long time. The process typically involves correlating a known pilot signal with different time-shifted replicas of the received signal. Without any prior knowledge of what time-shifts are probable, this may take a long time, increase the risk of false correlation peaks, and imply extensive receiver processing at the mobile station.

Furthermore, in future mobile systems, there may not be any pilot signals that are continuously transmitted from all base stations. Instead, these pilots may be switched on only when they are necessary. This will make the synchronization task even more challenging, since a missed measurement session due to an erroneous timing estimate implies additional control signalling to initiate another session and a risk for radio link failure due to serving cell signal deterioration.

There is thus a need for a mobile station mobility measurement procedure that limits the timing uncertainty when performing mobility measurements on target cells in non-synchronized networks.

SUMMARY

The invention is therefore directed towards improving mobile station synchronisation to a target cell when a pilot signal is transmitted during a limited time.

This object is according to a first aspect achieved through a method of simplifying synchronisation for a mobile station to a target cell in a wireless communication network. The method is performed by a synchronising assisting device and comprises:

sending an adjustment value to the mobile station for use when synchronising to a resource employed by the target cell, where the adjustment value is an estimate of the change in timing required to synchronise to a reference signal interval of the resource, and processing the adjustment value if an indication of the actual change in timing required for synchronizing to the reference signal interval is received from the mobile station.

The object is according to a second aspect achieved by a synchronising assisting device in a wireless communication network for simplifying synchronisation of a mobile station to a target cell. The synchronising assisting device comprises a processor acting on computer instructions whereby the synchronising assisting device is operative to:

send an adjustment value to the mobile station for use when synchronising to a resource employed by the target cell, where the adjustment value is an estimate of the change in timing required to synchronise to a reference signal interval of the resource, and process the adjustment value if an indication of the actual change in timing required for synchronizing to the reference signal interval is received from the mobile station.

The object is according to a third aspect achieved through a synchronising assisting device in a wireless communication network for simplifying synchronisation of a mobile station to a target cell. The synchronising assisting device comprises:

means for sending an adjustment value to the mobile station for use when synchronising to a resource employed by the target cell, where the adjustment value is an estimate of the change in timing required to synchronise to a reference signal interval of the resource, and means for processing the adjustment value if an indication of the actual change in timing required for synchronizing to the reference signal interval is received from the mobile station.

The object is according to a fourth aspect achieved through a computer program for simplifying synchronisation of a mobile station to a target cell in a wireless communication network. The computer program comprises computer program code which when run in a synchronising assisting device in the mobile communication network, causes the synchronising assisting device to:

send an adjustment value to the mobile station for use when synchronising to a resource employed by the target cell, where the adjustment value is an estimate of the change in timing required to synchronise to a reference signal interval of the resource, and process the adjustment value if an indication of the actual change in timing required for synchronizing to the reference signal interval is received from the mobile station.

The object is according to a fifth aspect achieved through a computer program product for synchronisation of a mobile station to a target cell in a wireless communication network, where the computer program product comprises a data carrier with computer program code according to the fourth aspect.

In a first variation of the first aspect, the method further comprises sending an order to the mobile station to perform measurements on the resource.

In a corresponding variation of the second aspect, the synchronising assisting device is further configured to send an order to the mobile station to perform measurements on the resource.

In a second variation of the first and second aspects, the adjustment value is based on the position of the mobile station.

In a third variation of the first aspect, the processing comprises adjusting the adjustment value using the actual change in timing in order to obtain an updated adjustment value for use in future synchronisations In a corresponding variation of the second aspect, the synchronising assisting device, when being operative to process the adjustment value, is operative to adjust the adjustment value using the actual change in timing in order to obtain an updated adjustment value for use in future synchronisations The adjusting may comprise using the actual change in timing as the updated adjustment value. It may also comprise adjusting the adjustment value based on the current and previously received indications of actual change in timing. Alternatively the adjusting may comprise forming an average of the current and previously received indications of actual change in timing and adjusting the adjustment value with this average In the latter case, the adjustment value is based on an average of previously received indications of actual change in timing and in a further variation of the first aspect, the method comprises comparing the received indication of the actual change in timing with the average and if the difference exceeds a restart indication threshold, discarding the previously received indications and providing a new adjustment value, which is non-related to the previously received indications.

In a corresponding variation of the second aspect, the synchronising assisting device when being operative to process the adjustment value may be operative to compare the received indication of the actual change in timing with the average and if the difference exceeds a restart indication threshold, discard the previously used indications and provide a new adjustment value, which is non-related to these previously used indications.

In yet another variation of the first aspect, the method comprises sending an uncertainty measure to the mobile station.

In a corresponding variation of the second aspect, the synchronising assisting device is further operative to send an uncertainty measure to the mobile station.

The uncertainty measure may be estimated based on values of previously received indications of actual change in timing. The uncertainty measure may be estimated using a statistical analysis function, such as standard deviation.

According to a sixth aspect, the above-described object is furthermore achieved through a method for synchronising to a reference signal interval of a resource used by a target cell in a wireless communication network. The method is performed by a mobile station and comprises:

receiving an adjustment value from a source cell, where the adjustment value is an estimate of the change in timing required to synchronise to the reference signal interval of the resource, synchronising to the resource starting at a starting point set by the adjustment value, detecting a pilot signal in the reference signal interval, determining an actual change in timing required for synchronising to the reference signal interval, investigating the difference between the starting point of the adjustment value and the actual change in timing, and sending an indication of the required actual change in timing to the source cell.

According to a seventh aspect, the object is also achieved through a mobile station for synchronising to a reference signal interval of a resource used by a target cell in a wireless communication network. The mobile station comprises a processor acting on computer instructions whereby the mobile station is operative to:

receive an adjustment value from a source cell, where the adjustment value is an estimate of the change in timing required to synchronise to the reference signal interval of the resource, synchronise to the resource starting at a starting point set by the adjustment value, detect a pilot signal in the reference signal interval, determine an actual change in timing required for synchronising to the reference signal interval, investigate the difference between the starting point of the adjustment value and the actual change in timing, and send the indication of the required actual change in timing to the source cell.

According to an eighth aspect, the object is achieved through a mobile station for synchronising to a reference signal interval of a resource used by a target cell in a wireless communication network, where the mobile station comprises:

means for receiving an adjustment value from a source cell, where the adjustment value is an estimate of the change in timing required to synchronise to the reference signal interval of the resource, means for synchronising to the resource starting at a starting point set by the adjustment value, means for detecting a pilot signal in the reference signal interval, means for determining an actual change in timing required for synchronising to the reference signal interval, means for investigating the difference between the starting point of the adjustment value and the actual change in timing, and means for sending the indication of the required actual change in timing to the source cell.

According to a ninth aspect, the object is also achieved through a computer program for synchronising to a reference signal interval of a resource used by a target cell in a wireless communication network. The computer program comprises computer program code which when run in a mobile station, causes the mobile station to:

receive an adjustment value from a source cell, where the adjustment value is an estimate of the change in timing required to synchronise to the reference signal interval of the resource, synchronise to the resource starting at a starting point set by the adjustment value, detect a pilot signal in the reference signal interval, determine an actual change in timing required for synchronising to the reference signal interval, investigate the difference between the starting point of the adjustment value and the actual change in timing, and send the indication of the required actual change in timing to the source cell.

According to a tenth aspect, the object is finally achieved through a computer program product for synchronising to a reference signal interval of a resource used by a target cell in a wireless communication network. The computer program product comprises a data carrier with computer program code according to the ninth aspect.

According to a first variation of the sixth aspect, the method further comprises receiving an instruction to perform measurements on the resource, performing measurements according to the instruction and reporting the measurement to the source cell.

According to a corresponding variation of the seventh aspect, the mobile station is further configured to receive an instruction to perform measurements on the resource, perform measurements according to the instruction and report the measurement to the source cell.

According to a second variation of the sixth aspect, the method further comprises comparing the difference between the actual change in timing and the adjustment of the adjustment value and only performing the sending if the difference exceeds a minimum difference threshold According to a corresponding variation of the seventh aspect, the mobile station is operative to compare the difference between the actual change in timing and the adjustment of the adjustment value and only perform the sending if the difference exceeds a minimum difference threshold.

According to a third variation of the sixth aspect, the method further comprises receiving an uncertainty measure from the source cell and using also the uncertainty measure in the synchronisation to the reference signal interval.

According to a corresponding variation of the seventh aspect, the mobile station is operative to receive an uncertainty measure from the source cell and use also the uncertainty measure in the synchronisation to the reference signal interval.

The invention has a number of advantages. It speeds up the synchronisation of the mobile station to the target cell when there is reference signal interval on the resource. Also the risk for timing estimation errors decreases. Furthermore, the computational load of the mobile station is reduced, which has a positive effect on battery consumption.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The present invention concerns handover in a wireless communication network, for instance a mobile communication network like a Long-Term Evolution (LTE), Universal Mobile Telecommunications System (UMTS) and Global System for Mobile Communications (GSM). These are just a few examples of networks where the invention may be implemented. Other types of networks that may be used are Wireless Local Area Networks (WLAN).

Figure 1:
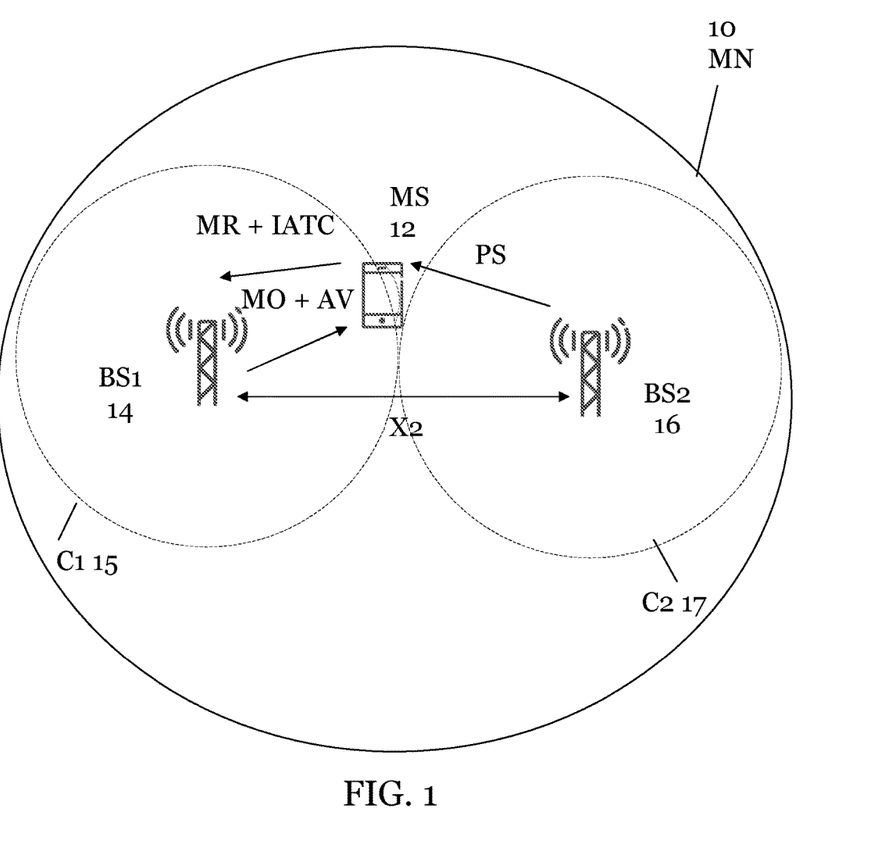
FIG. 1 schematically shows a wireless communication network comprising two neighbouring base stations and a mobile station, FIG. 2 schematically shows a reference signal interval of a radio resource used by a target cell in the wireless communication network.

FIG. 1 schematically shows a wireless communication network, which may be a network according to any of the above described types. Furthermore, the exemplifying communication network is in this case a mobile communication network MN 10 comprising a first base station BS 14 communication with a second base station BS2 16 via a base station interface, here denoted X2. The first base station 14 provides coverage of a first cell C1 15, while the second base station BS2, provides coverage of a second cell C2 17.

In FIG. 1 there is also shown a mobile station MS 12 which is indicated as being located at a border between the first and second cells C1 and C2. Because of this the mobile station 12, which in many systems is termed user equipment (UE) is able to communicate with both base stations 14 and 16. Some of this communication is schematically indicated in FIG. 1. The mobile station 12 is shown as receiving a measurement order MO and an adjustment value AV from the first base station 14 and to send a measurement report MR and an indication of actual timing change IATC to the first base station 14. The mobile station 12 is also shown as receiving a pilot signal PS from the second base station 16. These signals will be described in more detail later.

The base stations 14 and 16, which are often termed eNodeBs or just NodeBs, are furthermore provided in a part of the mobile communication network 10 termed access network or radio access network. In the mobile communication network 10 there may also be a core network. This is not central to the various aspects to be described and has therefore been omitted.

Figure 2:
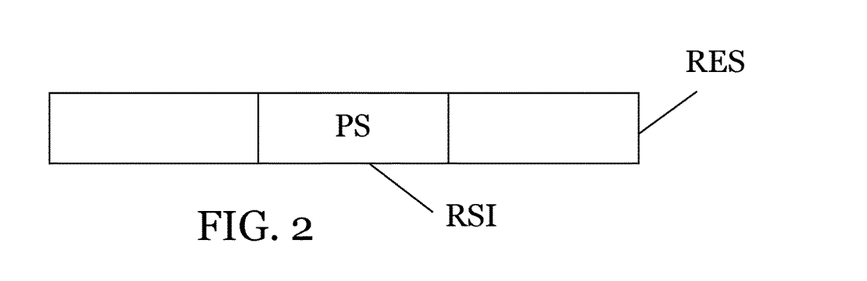

FIG. 2 schematically shows a resource RES used by the second base station 16 in order to transmit the pilot signal PS. A resource may be a frequency, a time interval, such as a time slot, or a combination of a frequency and time interval. It can be seen that in FIG. 2 the pilot signal PS is only transmitted in a limited part of the resource RES, which is a reference signal interval RSI.

Aspects of the invention are directed towards a synchronising assisting device. A synchronising assisting device may with advantage be implemented through a base station that serves a mobile station, which is a so-called serving base station. In FIG. 1 the first base station 14 is such a serving base station. This means that in the following the first cell C1 may be a serving cell. It will in the following be denoted as such. A serving base station is a node in the mobile communication system. It should be realized that the synchronising assisting device may be provided in another node than in the serving base station. However, if being provided in another network node it would be communicating with the serving base station.

Figure 3:
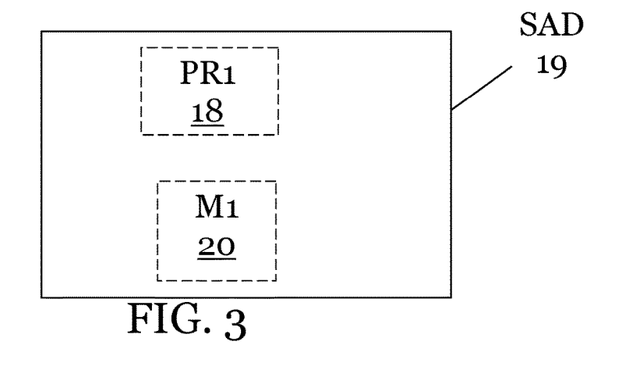
FIG. 3 shows a block schematic of a first realization of a synchronising assisting device in the wireless communication network.

FIG. 3 shows a block schematic of a first way of realizing the synchronising assisting device SAD 19. It may be provided in the form of a first processor PR1 18 connected to a first program memory M1 20. The first program memory 20 may comprise a number of computer instructions implementing the functionality of the synchronising assisting device 19 and the first processor 18 implements this functionality when acting on these instructions. It can thus be seen that the combination of first processor 18 and first memory 20 provides the synchronising assisting device 19.

Figure 4:
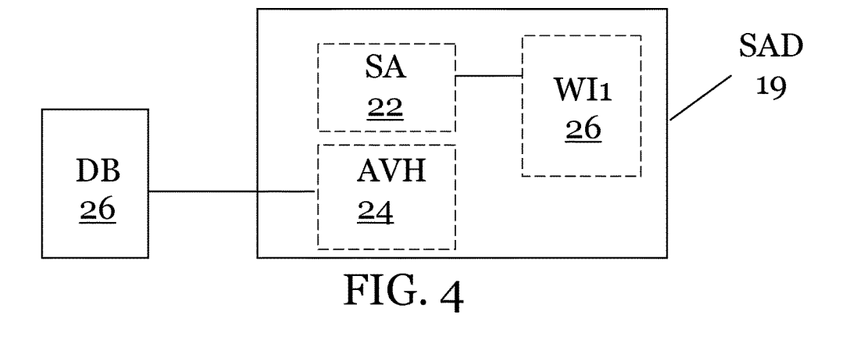
FIG. 4 shows a block schematic of a second realization of the synchronising assisting device.

FIG. 4 shows a block schematic of a second way of realizing the synchronising assisting device 19. The synchronising assisting device 19 may comprise a synchronising assisting unit SA 22, a first wireless interface WI1 26 and an adjustment value handing unit 24. The synchronising assisting unit 22 is here connected to the first wireless interface 26, while the adjustment value handling unit 24 is connected to a database DB 26. In FIG. 4 the database is shown as being an external entity, i.e. a separate device compared with the synchronising assisting device 19. It should however be realized that as an alternative it may be included in the synchronising assisting device 19.

Figure 5:
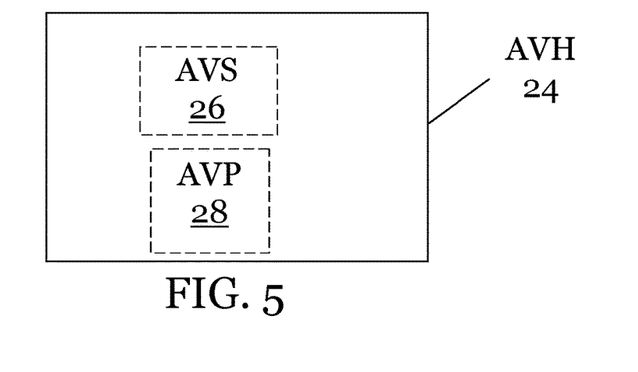
FIG. 5 shows a block schematic of an adjustment value handling unit in the second realization of the synchronising assisting device.

FIG. 5 schematically shows some blocks that may be included in the adjustment value handling unit 24. The adjustment value handling unit may comprise an adjustment value sending block AVS 26 and an adjustment value processing block AVP 28.

Figure 6:
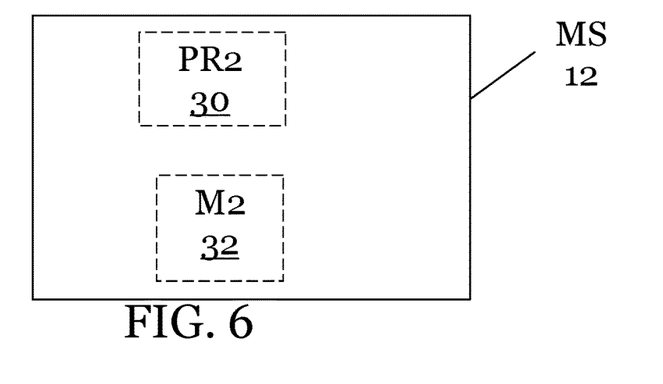
FIG. 6 shows a block schematic of a first realization of a mobile station.

FIG. 6 shows a block schematic of a first way of realizing some of the functionality of the mobile station MS 12. This functionality, which is used in relation to synchronisation to resources and more particularly synchronisation to the reference signal interval of a resource, may be provided in the form of a second processor PR2 30 connected to a second program memory M2 32. The second program memory 32 may comprise a number of computer instructions implementing the above-mentioned functionality of the mobile station 12 and the second processor 30 implements this functionality when acting on these instructions. It can thus be seen that the combination of second processor 30 and second memory 32 provides functionality related to the synchronisation to a reference signal interval of a resource.

Figure 7:
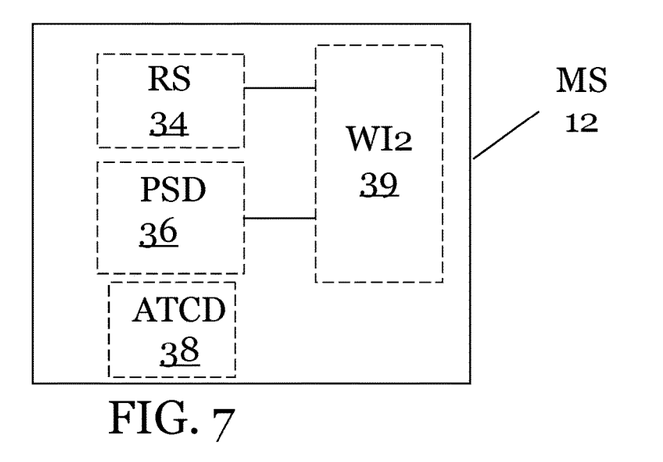
FIG. 7 shows a block schematic of a second realization of a mobile station.

FIG. 7 shows a block schematic of a second way of realizing the mobile station 12. The mobile station 12 comprises a second wireless interface WI2 39 connected to a resource synchronisation unit RS 34 and to a pilot signal detecting unit PSD 36. In the mobile station 12 there is also an actual timing change determining unit ATCD 38.

The units and blocks in FIGS. 3, 4 and 7 may be provided as software blocks for instance as software block in a program memory, but also as a part of dedicated special purpose circuits, such as Application Specific Integrated Circuits (ASICs) and Field-Programmable Gate Arrays (FPGAs). It is also possible to combine more than one unit or block in such a circuit.

In the example in FIG. 1, the mobile station 12 is initially communicating with the first base station 14. Furthermore during this communication, the mobile station may be involved in a communication session, such as video or voice communication session. However, it may also be another type of session such as file transfer session.

Thereby, the first base station 14 is a serving base station and the first cell C1 is a serving cell. As can be seen in FIG. 1 the mobile station 12 may be located at the border between the two cells C1 and C2. It may thereby enter the second cell C2 and at this point communication in the session should be taken over by the second base station 16. In mobile communication systems this is termed as the mobile station 12 being handed over to the second base station 16 or second cell C2. In this respect the second base station 16 is often referred to as a target base station and the second cell as a target cell, i.e. a cell and base station that is a target for a possible handover.

The normal way of handling handover is through the mobile station 12 synchronising to a pilot signal on a resource used by the target cell and measure quality parameters such as bit error rate BER and signal to noise ratio etc. and report these to the serving cell. Also similar measurements may be made with respect of the serving cell. Then, if the communication quality is better at the target cell, the mobile station is handed over.

The different base stations normally communicate according to a common structure, where a resource is assigned to a pilot signal. However, the structures are often not synchronised with each other. Furthermore, resources are limited in such systems and best used for various types of traffic. This means that it may be undesirable to use a whole resource for a pilot signal. It may be of interest to only use a part of a resource for a pilot signal, here termed a reference signal interval, as well as perhaps to only transmit a pilot signal on demand, i.e. when an activity requiring a pilot signal is to be performed by a mobile station. This means that the pilot signal may only be transmitted in a reference signal interval when it is needed.

The synchronising to a pilot signal is in itself a slow process. The process may typically involve tuning to the resource, i.e. tuning to the time slot and/or frequency of the resource, which tuning may form the starting point of the synchronisation. The synchronisation may then also involve correlating a known pilot signal with different time-shifted replicas of a received signal. Without any prior knowledge of what time-shifts are probable, this may take a long time, increase the risk of false correlation peaks, and imply extensive receiver processing at the mobile station. This process will most probably be further delayed in case the mobile station does not consider the reference signal interval.

Such a delay may result in degraded communication quality. Other consequences may comprise additional control signaling to initiate another session and a risk for radio link failure due to serving cell signal deterioration.

There is thus a need for a mobile station mobility measurement procedure that limits the timing uncertainty when synchronizing to a resource.

Aspects of the invention are directed towards improving on the above-mentioned situation.

Figure 8:
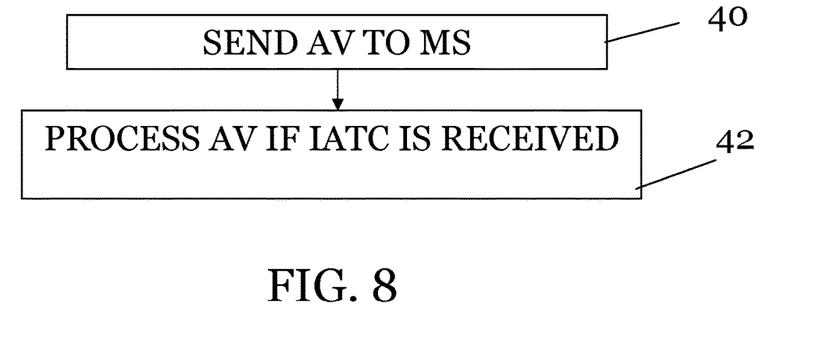
FIG. 8 shows a flow chart of a number of method steps being performed in the synchronising assisting device in a method for simplifying synchronisation according to a first embodiment.
Figure 9:
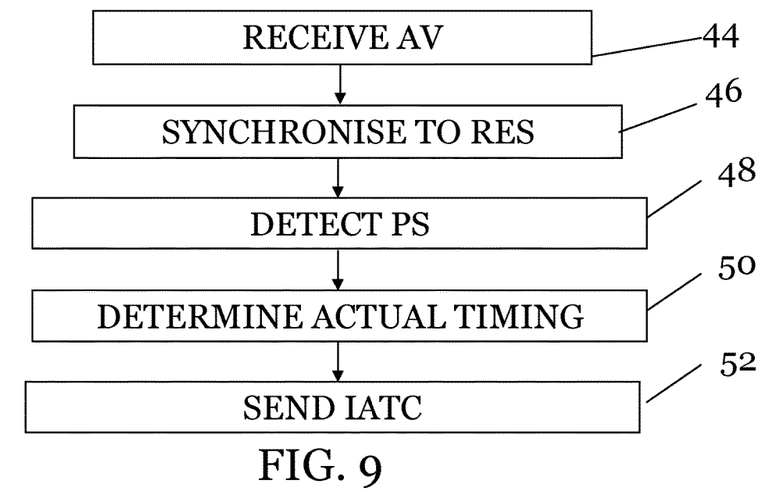
FIG. 9 shows a flow chart of a number of method steps being performed in the mobile station in a method for synchronising to a reference time interval according to the first embodiment.

A first embodiment will now be described with reference being made also to FIGS. 8 and 9, where FIG. 8, shows a flow chart of method steps being performed in a method of assisting synchronisation and being performed in the synchronising assisting device and FIG. 9 shows a flow chart of a number of method steps in a method for synchronising to a reference time interval of a resource and being performed by the mobile station 12.

In the following the synchronising assisting device is implemented in the first base station 14 acting as a serving base station.

The first embodiment is started through the synchronising assisting device and then with advantage the synchronising assisting unit 22 of the synchronising assisting device 19 deciding that the mobile station 12 needs to synchronise to a pilot signal of the target cell C2, i.e. to a pilot signal PS transmitted by the second base station 16. This may be done because the serving base station has decided that the handover may be necessary, for instance because of a low communication quality of the communication session. However, it should be realized that there may also exist other reasons for the synchronising assisting device determining that the mobile station needs to synchronize to another base station than the serving one. This may be done if for instance needing to collect data on the resource, such as information about the cell or base station.

Once this decision has been made, the synchronising assisting unit 22 may also send an instruction to the target base station 16 that a pilot signal is to be transmitted in the target cell C2. This instruction may be sent via the X2 interface. The target base station may in this case respond with information about the resource, such as information about the frequency and/or time slot used.

As an alternative it is possible that the target base station 16 is set to transmit the pilot sequence PS in a predetermined reference signal interval RSI of a pre-determined resource RES.

The synchronising assisting unit 22 may then connect to the adjustment value handling unit 24 and more particularly to the adjustment value sending block 26, in order to obtain an adjustment value AV. The adjustment value sending block 26 may in this case fetch an adjustment value AV from the database 26. The value provided may also depend on the position of the mobile station 12. As an alternative it may generate a new adjustment value, which may take place if the database is empty. A newly generated adjustment value AV may be a random value. It may also be a value that considers network planning data concerning known distances between the two base stations. The adjustment value is an estimation of the starting time of the reference signal interval RSI used by the target cell C2.

Then the adjustment value sending block 26 provides the synchronising assisting unit 22 with the adjustment value AV.

The synchronising assisting unit 22 then sends the adjustment value AV to the mobile station 12 via the first wireless interface 26, step 40, which adjustment value may be accompanied by information about the resource RES as well as a measurement order MO, i.e. an order to the mobile station 12 to perform measurements on the pilot signal PS. It is possible that the mobile station is already aware that measurements are needed and/or which resource is used by the target cell, in which case this information does not need to be transmitted.

The adjustment value AV together with the optional measurement order and resource information are then received by the resource synchronisation unit 34 in the mobile station 12 via the wireless interface 39, step 44. As stated earlier, these may be optional because the mobile station may already know the resource used and what measurements are to be made. Alternatively there may be no need for any measurements of the properties of the resource.

After this has been done the resource synchronisation unit 34 synchronises to the resource RES starting at a starting point set by the adjustment value AV, step 46. Thereafter the pilot signal detecting unit 36 waits until it detects the pilot signal PS on the resource RES, step 48, It thus waits until it has detected the pilot signal on the resource RES. When the pilot signal PS has been detected, the pilot signal detecting unit 36 informs the actual timing change determining unit 38 about the detection. It may also inform of the starting point or starting time of the pilot signal PS. It may also collect data on the resource.

The pilot signal PS may with advantage start to be transmitted at a fixed time in relation to the start of the reference time interval RTI, such as at the start of the reference time interval RTI. The actual timing change determining unit 38 may thus determine the actual starting time of the reference signal interval based on the information received from the pilot signal detecting unit 36.

Then the actual timing change determining unit 38 determines the actual change in timing ATC for synchronising to the start of the reference signal interval, step 50, and then sends an indication of this actual change in timing IATC, to the synchronising assisting device via the second wireless interface 39, step 52. It is here possible that the sending is conditional. It may only be sent if the difference between the estimated starting time and the actual starting time exceeds a minimum difference threshold. Alternatively the indication may always be sent irrespective of the size of the difference. It is possible that the indication IATC is accompanied by measurement results MR of measurements made on the pilot signal.

If the synchronising assisting unit 22 of the synchronising assisting device 19 receives the indication via the first wireless interface 26, this indication 19 is then forwarded to the adjustment value processing block 28 of the adjustment value handling unit 24, which then processes the adjustment value, step 42.

The processing may involve adjusting the adjustment value AV using the actual change in timing in order to obtain an updated adjustment value AV for use in future synchronisations. This adjusting may involve setting the actual change in timing as the updated adjustment value. It may alternatively involve adjusting the adjustment value based on the current and previously received indications of actual change in timing. These previous indications may be all previous indications. Alternatively they may be a limited group of the latest earlier received indications. The adjusting may furthermore involve forming an average of the group of values and using this average for adjusting. The new adjustment value may as an example be set as this average.

If measurements were received, it is also possible that the synchronising assisting unit 22 determines that handover is to be made and also performs it.

With the proposed solution, the time it takes to acquire synchronization to a target cell is reduced, the risk for timing estimation errors diminishes, and the computational load of the mobile station is reduced.

Figure 10:
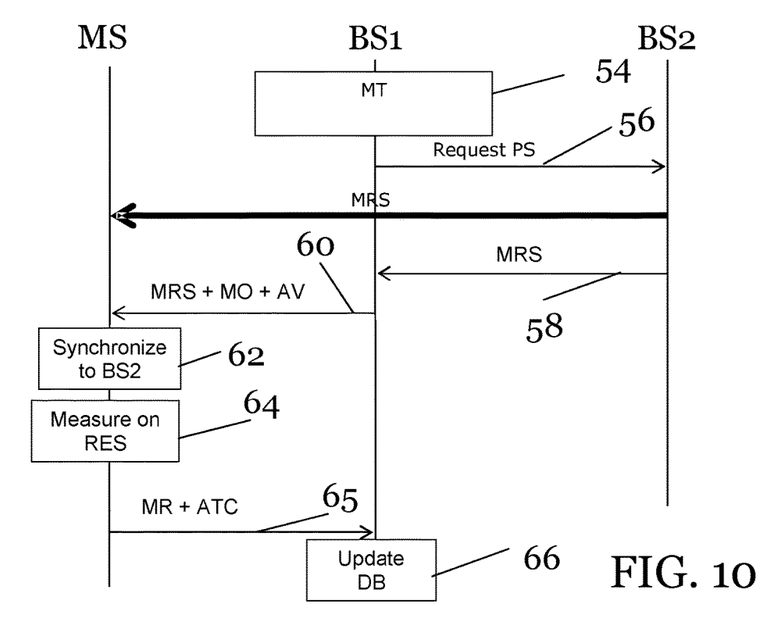
FIG. 10 shows signals exchanged between the synchronising assisting device, the mobile station and a target base station in a second embodiment.

Now a second embodiment will be described with reference being made to FIG. 10, which shows signals exchanged between the synchronising assisting device represented by the first base station 14, the mobile station 12 and the target base station represented by the second base station 16. In this way the first base station is a serving base station and the second base station a target base station.

The mobile station 12 has an ongoing connection with the first base station 14, which also optionally has knowledge of the mobile station position.

The synchronising assisting unit 22 then determines that a handover is necessary, which may be done via a measurement trigger MT 54. The synchronising assisting unit 22 may thus decide that communication quality measurements are to be made, perhaps by both the serving base station and the mobile station.

The synchronising assisting unit 22 then sends a request 56 to the second base station 16 to activate pilot signals PS, such as downlink reference signals. In the following, the provision of reference signals will be denoted mobility reference signalling (MRS).

On reception of that request, the second base station 16, which acts as a target base station, decides which time/frequency resources to use for the transmission of the MRS, and starts transmitting the pilot signal PS on the assigned resource RES. When the transmission has started, the target base station 16 sends an MRS allocation message 58 to the synchronising assisting device 19, which message 58 contains the time/frequency resources of the activated MRSs.

The synchronisation assisting unit 22 also obtains an adjustment value form the adjustment value handling unit 24, which in turn may have fetched it from the database 26. The adjustment value AV may be positive or negative, depending on the frame and symbol timing relationship of the base stations 14 and 16. The adjustment value AV may thus be read from the data base 26, which is maintained by the synchronising assisting device. This database may also be termed a time offset data base. Data related to the handover may used to index the data base. Examples of such data are: the target base station, the mobile station position, the received signal strength of the serving base station, serving beam when serving base station is equipped with multi-beam antennas. An example of such a table is shown in Table 1.

TABLE 1

| Target base station | UE position | Time offset |
|---|---|---|
| $BS_1$ | $Pos_1$ | $AV_1$ |
| $BS_1$ | $Pos_2$ | $AV_2$ |
| ⋮ | ⋮ | ⋮ |

TABLE 1-continued

| Target base station | UE position | Time offset |
|---|---|---|
| ⋮ | ⋮ | ⋮ |
| $BS_1$ | $Pos_n$ | $AV_n$ |
| $BS_2$ | $Pos_1$ | $AV_{n+1}$ |
| ⋮ | ⋮ | ⋮ |

In systems with small intersite distances (ISD), the mobile station position column may be omitted, since the same adjustment value provides sufficiently good MRS detection performance for all mobile stations in a given cell.

The synchronisation assisting unit 22 of the synchronising assisting device 19 forwards the MRS allocation message to the mobile station 12. It also sends the adjustment value AV, i.e. a time offset proposal as well as a measurement order MO 60.

The mobile station 12 receives the MRS allocation message, the proposed adjustment value AV, measurement order MO 60 and MRS allocation message. The resource synchronisation unit 34 of the mobile station 12 adds the adjustment value AV to the timing of the transmissions of its serving cell to obtain an initial timing reference estimate for the target cell 16. The resource synchronisation unit 34 then uses that value as a starting point for its search for timing synchronization. The mobile station may perform the synchronization procedure over a range of timing references around the initial timing reference estimate, where the span of the range may be determined based on the accuracy of previous proposals received from the serving cell C1. The more accurate this synchronization proposal is, the faster the mobile station 12 will find the synchronization. Any state of the art synchronization algorithm can be used by the mobile station 12.

Once the mobile station 12 has obtained timing synchronization to the target cell 62 and decoded the pilot signal PS, the actual timing change determining unit 38 calculates the actual change in timing ACT between the first base station 14 and the second base station 16. It then performs all the measurements 62 on the resource and reads any information required as part of the handover process. Such measurements may include signal strength and signal quality, and the information may include the identity of the second base station 16. The mobile station 12 sends the measurement results MR with these measurement values and information to the first base station 14 and includes also the calculated actual change in timing ATC or actual offset 65. In one embodiment, the time offset may only be included if it is different from the time offset proposed by the serving base station, i.e., the time offset of the adjustment value AV, or if the difference exceeds a predetermined difference threshold.

The first base station 14 collects handover measurements from the mobile station 12, and the synchronisation assisting unit 22 may use these to potentially carry out the handover. No matter if the mobile station 12 is handed over to the second base station 16 or not, the first base station 14 stores 66 the reported actual change in timing ATC or time offset in the time offset database 26, together with data related to the handover. In case no actual change in timing ATC is reported, the adjustment value handling unit 24 assumes the actual change in timing is equal to the time offset proposed in the adjustment value AV. As more handover measurements are performed, the time offset database 26 grows. The adjustment value proposals may thereby become more accurate as more data is collected, and with this, the time it takes for the mobile station 12 to acquire synchronization is reduced.

In general, the relative timing references between individual base stations may vary over time due to local frequency reference differences and the associated timing drift. In some network deployments, the timing reference drift over time may be avoided e.g. by using automatic frequency correction techniques, such as those described in WO 2010/069843 or by using GPS absolute time information. In such systems, the timing offset table information may remain valid over an extended time and may be continuously updated with current reports, or considered stable and not updated any further. In other deployments where no timing drift avoidance is employed, the adjustment values between pairs of base stations may change over time. In such cases, the more recent adjustment value may be weighted higher when sending an adjustment value AV to a mobile station as part of the mobility measurement command. Such weighting may be achieved e.g. by applying exponential smoothing with a forgetting factor chosen based on the maximum frequency offset between the base stations and the resulting rate of change of the adjustment value.

Regardless of whether a timing drift between base stations is present or not, the relative timing offsets generally change abruptly when one of the nodes is restarted. In one variation the restart may be detected by comparing whether the current actual change in timing from the mobile station concurs with the average actual change in timing based on previous reports. This variation is performed by the adjustment value processing block 28 and the method steps of it are generally outlined in FIG. 11.

Figure 11:
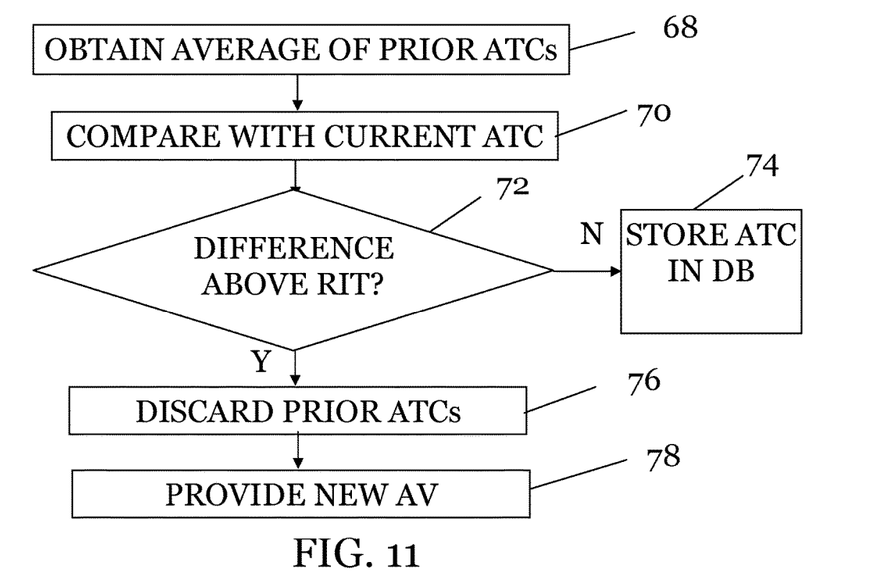
FIG. 11 shows a flow chart of a number of further method steps being performed in the synchronising assisting device in a variation of the method for simplifying synchronisation.

In this scheme an average of previously received actual changes of timing are obtained, step 68, and compared with the latest or current actual change in timing ATC, step 70. If a discrepancy exceeding a restart indicating threshold RIT is detected, step 72, the timing offset database entries for a given neighbouring base station are reset, i.e., the prior values of actual change of timing ACT discarded, step 76, and new data collection is started through providing a new adjustment value, step 78. If the discrepancy was below the threshold, step 72, then the current actual change in timing value is used in the updating of the adjustment value as well as stored in the database, step 74.

In a preferred embodiment, each base station maintains one time offset database. The idea is that the time offset is similar for handovers that are similar. In a somewhat idealized situation, the time offset is uniquely determined by the (exact) mobile station position and the target cell. The time offset proposal transmitted from the serving base station 14 is based on the current information in the time offset data base. The lookup in this data base can be performed in several ways, as there may be no exact match for a candidate handover. In one embodiment, the serving base station may, along with the timing offset proposal value, also provide an uncertainty measure that describes the distribution of the available information in the table. The mobile station can use the uncertainty measure to select the appropriate timing synchronization search range. The uncertainty measure may be estimated based on values of previously received indications of actual change in timing. The uncertainty measure may be estimated using a statistical analysis function, such as standard deviation. However, it is known that other types of statistical functions may be used such as variance.

It can in this way be seen that synchronisation to a resource by a mobile station is speeded up when pilot signals are sent in a reference signal interval of the resource. This saves battery in the mobile station and reduces the risk of unwanted consequences such as loss of a communication session. Furthermore, the accuracy of the synchronisation timing is improved over time.

Figure 12:
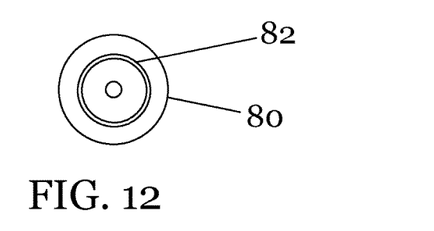
FIG. 12 shows a computer program product comprising a data carrier with computer program code for implementing the functionality of the synchronising assisting device.

The computer program code of a synchronisation assisting device 19 may be in the form of computer program product for instance in the form of a data carrier, such as a CD ROM disc or a memory stick. In this case the data carrier carries a computer program with the computer program code, which will implement the functionality of the above-described synchronisation assisting device. One such data carrier 80 with computer program code 82 is schematically shown in FIG. 12.

Figure 13:
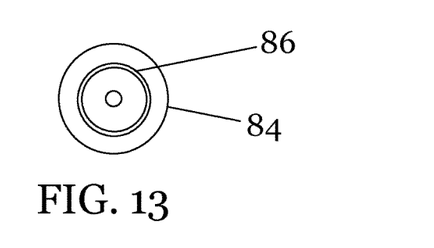
FIG. 13 shows a computer program product comprising a data carrier with computer program code for implementing functionality of the mobile station.

Also the computer program code of the synchronisation functionality of the mobile station may be in the form of computer program product for instance in the form of a data carrier, such as a CD ROM disc or a memory stick. In this case the data carrier carries a computer program with the computer program code, which will implement the synchronisation functionality of the above-described mobile station. One such data carrier 84 with computer program code 86 is schematically shown in FIG. 13.

The synchronising assisting device may also be considered to comprise:

means for sending an adjustment value to the mobile station for use when synchronising to a resource employed by the target cell, where the adjustment value is an estimate of the change in timing required to synchronise to a reference signal interval of the resource, and means for processing the adjustment value if an indication of the actual change in timing required for synchronizing to the reference signal interval is received from the mobile station.

The synchronising assisting device may be further considered to comprise means for sending an order to the mobile station to perform measurements on the resource.

The means for processing the adjustment value of the synchronising assisting device may be further considered to comprise means for adjusting the adjustment value using the actual change in timing in order to obtain an updated adjustment value for use in future synchronisations.

The means for adjusting the adjustment value may in this case be means for adjusting the adjustment value based on the current and previously received indications of actual change in timing. Alternatively the means for adjusting the adjustment value may be means for forming an average of the current and previously received indications of actual change in timing and means for adjusting the adjustment value with this average.

The synchronising assisting device may further be considered to comprise means for comparing the received indication of the actual change in timing with the average and means for, if the difference exceeds a restart indication threshold, discarding the previously received indications and means for providing a new adjustment value, which is non-related to the previously received indications.

The synchronising assisting device may further be considered to comprise means for sending an uncertainty measure to the mobile station. The synchronising assisting device may also be considered to form means for estimating the uncertainty measure using a statistical analysis function.

The mobile station may in turn be considered to comprise means for receiving an adjustment value from a source cell, where the adjustment value is an estimate of the change in timing required to synchronise to the reference signal interval of the resource, means for synchronising to the resource starting at a starting point set by the adjustment value, means for detecting a pilot signal in the reference signal interval, means for determining an actual change in timing required for synchronising to the reference signal interval, means for investigating the difference between the starting point of the adjustment value and the actual change in timing, and means for sending the indication of the required actual change in timing to the source cell.

The mobile station may also be considered to comprise means for receiving an instruction to perform measurements on the resource, means for performing measurements according to the instruction and means for reporting the measurement to the source cell.

The mobile station may further be considered as comprising means for comparing the difference between the actual change in timing and the adjustment of the adjustment value and means for only performing the sending if the difference exceeds a minimum difference threshold.

The mobile station may also be considered as comprising means for receiving an uncertainty measure from the source cell and means for using also the uncertainty measure in the synchronisation to the reference signal interval.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims. This invention has for instance been exemplified with E-UTRAN and EPC (i.e. LTE/SAE). However it should be realized that the invention can be used in other mobile networks.

The invention claimed is:

1. A method of simplifying synchronisation for a mobile station to a target cell in a wireless communication network, the method being performed by a synchronising assisting device and comprising:
   sending an adjustment value to the mobile station for use when synchronising to a resource employed by the target cell, the adjustment value being an estimate of the change in timing required to synchronise to a reference signal interval of the resource; and
   processing the adjustment value if an indication of the actual change in timing required for synchronizing to the reference signal interval is received from the mobile station, wherein the processing comprises adjusting the adjustment value using the actual change in timing, to obtain an updated adjustment value for use in future synchronisations.

2. The method according to claim 1, further comprising sending an order to the mobile station to perform measurements on the resource.

3. The method according to claim 1, wherein the adjustment value is based on the position of the mobile station.

4. The method according to claim 1, wherein the adjusting comprises using the actual change in timing as the updated adjustment value.

5. The method according to claim 1, wherein the adjusting comprises adjusting the adjustment value based on the current and previously received indications of actual change in timing.

6. The method according to claim 1, wherein the adjusting comprises forming an average of the current and previously received indications of actual change in timing and adjusting the adjustment value with the average.

7. The method according to claim 6, wherein the adjustment value is based on an average of previously received indications of actual change in timing and the method comprises comparing the received indication of the actual change in timing with said average and if the difference exceeds a restart indication threshold, discarding the previously received indications and providing a new adjustment value that is not dependent on the previously received indications.

8. The method according to claim 1, further comprising sending an uncertainty measure associated with the adjustment value to the mobile station.

9. The method according to claim 8, further comprising estimating the uncertainty measure using a statistical analysis function as applied to previously received indications of actual change in timing, the previously received indications received in association with corresponding adjustment values sent to one or more given mobile stations.

10. A synchronising assisting device in a wireless communication network for simplifying synchronisation of a mobile station to a target cell, the synchronising assisting device comprising a processor acting on computer instructions whereby said synchronising assisting device is operative to:
    send an adjustment value to the mobile station for use when synchronising to a resource employed by the target cell, the adjustment value being an estimate of the change in timing required to synchronise to a reference signal interval of the resource, and
    process the adjustment value if an indication of the actual change in timing required for synchronizing to the reference signal interval is received from the mobile station, based on adjusting the adjustment value using the actual change in timing, to obtain an updated adjustment value for use in future synchronisations.

11. The synchronising assisting device according to claim 10, wherein the adjustment value is based on an average of previously received indications of actual change in timing and the synchronising assisting device when being operative to process the adjustment value is operative to compare the received indication of the actual change in timing with said average and if the difference exceeds a restart indication threshold, discard the previously used indications and provide a new adjustment value that is not dependent on the previously received indications.

12. The synchronising assisting device according to claim 10, being further operative to send an uncertainty measure associated with the adjustment value to the mobile station.

13. The synchronising assisting device according to claim 12, being further operative to estimate the uncertainty measure using a statistical analysis function as applied to previously received indications of actual change in timing, the previously received indications received in association with corresponding adjustment values sent to one or more given mobile stations.

14. A method for synchronising to a reference signal interval of a resource used by a target cell in a wireless communication network, the method being performed by a mobile station and comprising the steps of:
    receiving an adjustment value from a source cell, the adjustment value being an estimate of the change in timing required to synchronise to the reference signal interval of the resource,
    synchronising to the resource starting at a starting point set by the adjustment value,
    detecting a pilot signal in the reference signal interval,
    determining an actual change in timing required for synchronising to the reference signal interval, investigating the difference between the starting point of the adjustment value and the actual change in timing, and sending an indication of the required actual change in timing to the source cell.

15. The method according to claim 14, further comprising receiving an instruction to perform measurements on the resource, performing measurements according to the instruction and reporting the measurement to the source cell.

16. The method according to claim 14, further comprising comparing the difference between the actual change in timing and the adjustment of the adjustment value and only performing the sending if the difference exceeds a minimum difference threshold.

17. The method according to claim 14, further comprising receiving an uncertainty measure from the source cell and using also the uncertainty measure in the synchronisation to the reference signal interval.

18. A mobile station for synchronising to a reference signal interval of a resource used by a target cell in a wireless communication network, the mobile station comprising a processor acting on computer instructions whereby said mobile station is operative to:

receive an adjustment value from a source cell, the adjustment value being an estimate of the change in timing required to synchronise to the reference signal interval of the resource, synchronise to the resource starting at a starting point set by the adjustment value, detect a pilot signal in the reference signal interval, determine an actual change in timing required for synchronising to the reference signal interval, investigate the difference between the starting point of the adjustment value and the actual change in timing, and send an indication of the required actual change in timing to the source cell.

19. The mobile station according to claim 18, being further operative to compare the difference between the actual change in timing and the adjustment of the adjustment value and only perform the sending if the difference exceeds a minimum difference threshold.

20. The mobile station according to claim 18, being further operative to receive an uncertainty measure from the source cell and use also the uncertainty measure in the synchronisation to the reference signal interval.

* * * * *